United States Patent [19]

Nogradi

[11] Patent Number: 5,974,518
[45] Date of Patent: Oct. 26, 1999

[54] SMART BUFFER SIZE ADAPTATION APPARATUS AND METHOD

[75] Inventor: Christopher I. Nogradi, Tamarac, Fla.

[73] Assignee: Milgo Solutions, Inc., Sunrise, Fla.

[21] Appl. No.: 08/831,670

[22] Filed: Apr. 10, 1997

[51] Int. Cl.$^6$ .................................................. G06F 12/00
[52] U.S. Cl. ........................................ 711/173; 709/236
[58] Field of Search ................................ 711/173, 171; 395/200.66

[56] References Cited

U.S. PATENT DOCUMENTS 5,784,698  7/1998  Brady et al. ............................ 711/171

OTHER PUBLICATIONS

Robbins et al.; Buffered Banks in Multiprocessor Systems; IEEE Transactions on Computers; vol 44, No. 4, Apr. 1995.

Primary Examiner—Parshotam S. Lall
Assistant Examiner—Kenneth R. Coulter
Attorney, Agent, or Firm—Milgo Solutions, Inc.

[57] ABSTRACT

Disclosed is a network device having a shared memory, a controller for storing Ethernet frames in frame buffers using data chaining to divide up at least the larger frames over a plurality of same sized buffers in the shared memory, wherein there is a tradeoff between using 1) larger buffers capable of receiving more of or all of the larger frames (more wasted buffer space) or 2) smaller buffers requiring more data chaining (wastes processing time to reassemble the frames) and an Ethernet driver having a buffer size adaptation routine which uses an algorithm to dynamically size the buffers. The algorithm records the average frame size during a window of time and uses the average frame size plus an overshoot to reconfigure the buffers' size, when either of the above two stated problems are occurring because the buffer is too large or too small, but with 1) safeguards built into the algorithm to prevent too frequent reconfigurations and 2) the option of including preferences favoring minimization of one of the above stated problems over the other.

30 Claims, 5 Drawing Sheets

SMART BUFFER SIZE ADAPTATION APPARATUS AND METHOD

BACKGROUND OF THE INVENTION

1. Field of the Invention

This invention relates to packet or frame buffering for frame handling devices.

2. Description of Background Art

Local area network ("LAN") traffic, by its nature tends to be transmitted in bursts. Hence, it is often necessary for an Ethernet driver (software interface between Ethernet controller and operating system and/or Ethernet data link layer) to buffer a number of Ethernet frames before they are actually processed by the higher layers of the protocol software. This buffering at the driver/Ethernet controller interface is especially important in an embedded environment where processor power is not always available.

Typically, a memory shared by the Ethernet driver and the Ethernet controller is divided into a plurality of same size buffers. It is a common practice for the size of the buffers to be determined by either the largest size incoming frame or the largest size frame that will be processed by the higher layers. When this is the case, if the buffer size used is much larger than the typical size of an incoming frame, many of the buffers are underutilized. Hence, a substantial amount of buffer space is wasted. Additionally, with a shared memory of limited size, the use of large buffers may result in there not being enough available buffers to store repeated small bursts of data, when the processor is busy performing other tasks. Hence, large buffers that are too few in number may result in frames being lost.

To make the most out of the buffer space available in the shared memory, some Ethernet controllers are provided with the ability to data chain buffers. This feature enables the driver to receive a frame larger than a buffer since the frame can be split up over multiple buffers. However, when this data chaining feature is used, if the buffer size chosen is smaller than the average size of all incoming packets, the driver might spend a substantial amount of time parsing through buffer descriptors attempting to re-assemble packets. This can be costly as to processing resources. On the other hand, if the buffers' size is made too large to reduce the amount of data chaining, then the above problems of underutilizing the buffers and/or shortages in the number of buffers may occur. Hence, there is a tradeoff between wasting buffer space (and therefore requiring more memory or losing data because of not being able to handle minimal network loading) and wasting processing power (and therefore requiring more processing power or losing functionality or data).

When designing an Ethernet driver for an Ethernet controller which supports data chaining, it is necessary for the software developer to determine the most appropriate size for the frame buffers taking into account the above tradeoffs. Since the designer can only guess what the average size frame to the unit in the field might be, it is difficult to find a medium solution in which both problems can be eliminated.

Many Ethernet controllers use descriptor tables or rings to organize incoming and outgoing data or frame buffers. Each descriptor is associated with a buffer. Within the descriptor is the size and location of the buffer as well as flags that describe the status of the buffer. These flags are used by the Ethernet driver and controller to determine who is currently in control of the buffer and if the buffer has data in it or not. For Ethernet controllers that support data chaining, the flags also specify whether the data in the buffer is the start, middle or end of the frame. For incoming Ethernet frames, the controller stores the data for each frame in a buffer and marks the buffer as being full in the descriptor. If the frame is too big to fit in one buffer, it will be split up among multiple buffers if the controller supports data chaining. Since the Ethernet driver is responsible for passing packets to the higher protocol layers, it is its responsibility to re-assemble them.

SUMMARY OF THE INVENTION

The present invention is directed toward a data communication system, comprising a frame processing device having a driver and a processor for executing the driver; a LAN controller for receiving LAN frames; a shared memory operable for being accessed by the driver or the controller; and the driver including memory dividing means for dividing the shared memory into a plurality of frame buffers. The controller includes frame storing means for storing each frame in one of the frame buffers in response to the frame being equal to or less than the size of the one buffer and for storing each frame in a plurality of the frame buffers in response to the frame exceeding the size of the one buffer. The memory dividing means includes monitoring means for determining sizing of the frames over a period of time and size adjusting means for adjusting the size of the frame buffers in response to the determined sizing of said frames.

To overcome the design guess work described in the Background section, the LAN driver of the present invention includes a smart buffer size adaptation feature. This feature uses the LAN controller's data chaining capability coupled with an algorithm to re-adapt the size of the receive buffers of the shared memory according to the demand of the network. The LAN driver smart buffer size adaptation feature is beneficial to embedded platforms, such as digital access devices, to maximize the use of precious buffer space while minimizing the strain on the processor. When using this adaptation feature, an embedded platform is more likely to be able to respond to traffic generated by a more powerful server.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
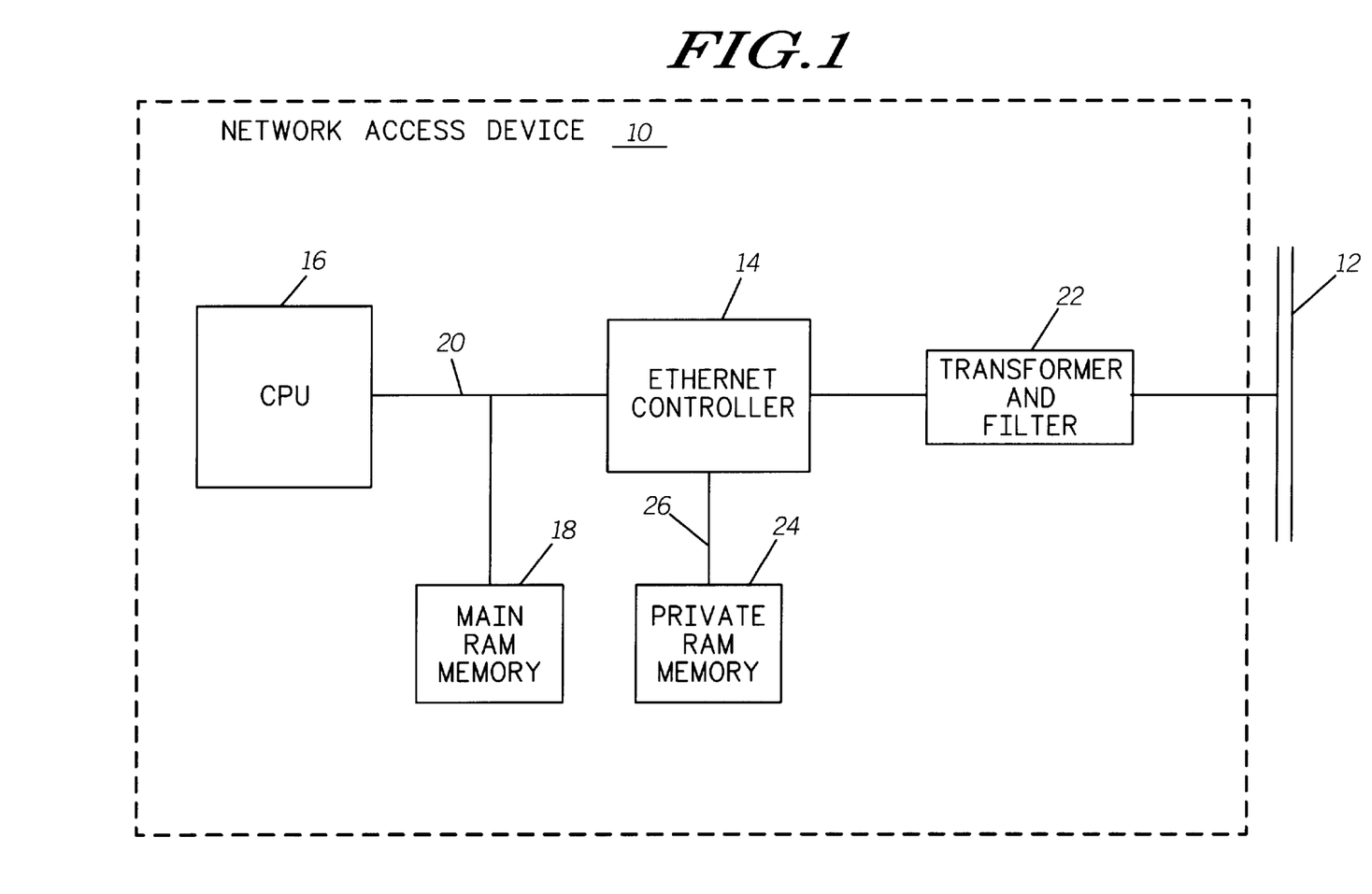
FIG. 1 is a generalized block diagram of the hardware aspects of an illustrative digital access device utilizing the present invention.

With respect to FIG. 1, disclosed is a Network Access Device ("NAD") 10 having a frame buffer size adaptation procedure of the present invention. The NAD 10, which is coupled to an Ethernet LAN 12, receives Ethernet frames from the LAN 12 and places the Ethernet frames onto the LAN 12. In the preferred embodiment, the NAD 10 comprises a Digital Service Unit ("DSU"). Ethernet frames of information are transmitted and received on the LAN 12 using Carrier Sense Multiple Access/Collision Detection ("CSMA/CD") access, which may, for example, be compliant with IEEE 802.3 media access layers or Ethernet (DIX).

The NAD 10, in the form of the DSU described above, is a common data communications device for accessing a Digital Data Service ("DDS") network. More specifically, the DSU is used to transmit digital signals from a customer premise onto the DDS network (not shown) and to receive digital signals from such DDS network for delivery to the customer premise. Additionally, it is a common practice to provide network management and control of a plurality of such DSUs from a central site location. In the preferred embodiment, the above described Ethernet frames include information used to provide such network management and control of the DSU from the central site location (not shown). For example, the DSU may be accessed via TCP/IP using either Simple Network Management Protocol (SNMP) or TELNET. Hence, in the illustrative applications, the NAD 10 accesses a primary network, e.g., DDS network (not shown), typically having customer data and also accesses a secondary network, i.e., the LAN 12, typically having management and control data.

Although the NAD 10 is shown in the preferred embodiment for the device in which the present invention is implemented, those skilled in the art will understand that there is a number of frame handling devices that can receive frames using the buffer adaptation arrangement of the present invention in place of the NAD 10. Such frame handling devices may include frame transmitting devices, such as the NAD 10, eg. DSU in the preferred embodiment or frame processing device, such as a LAN analyzer or monitoring device. In general, any equipment or unit receiving frames (not just LAN or Ethernet frames) for further processing or transmission can be used in combination with the buffer adaptation arrangement of the present invention. Likewise, there are any number of applications other than network management that could generate the LAN frame traffic on the LAN 12. Hence, both the DSU for NAD 10 and the network management application for the LAN 12 are merely illustrative and are not intended to be limiting on the present invention. The hardware aspects of the NAD 10 are illustrated in FIG. 1 and the computer program aspects of the NAD 10 are illustrated in FIG. 2.

With respect to FIG. 1, in the preferred embodiment, the NAD 10 includes a conventional LAN or Ethernet controller 14 for connecting the NAD 10 to the LAN 12 via a 10Base-T interface, for example. The NAD 10 includes a main CPU or processor 16, which is coupled to a main RAM memory 18 and the controller 14 by a conventional ISA system bus 20. The 10Base-T interface of the controller 14 is connected through a transformer and filter 22 to the LAN 12. The Ethernet controller 14 comprises Advanced Micro Devices PCnet-ISA Single Chip Ethernet Controller, having a part number of Am79C960. This Ethernet controller 14 is coupled to a shared, static RAM memory 24 via a private bus 26. The shared memory 24 is an 8-bit memory and occupies 64 Kbytes of address space.

Figure 2:
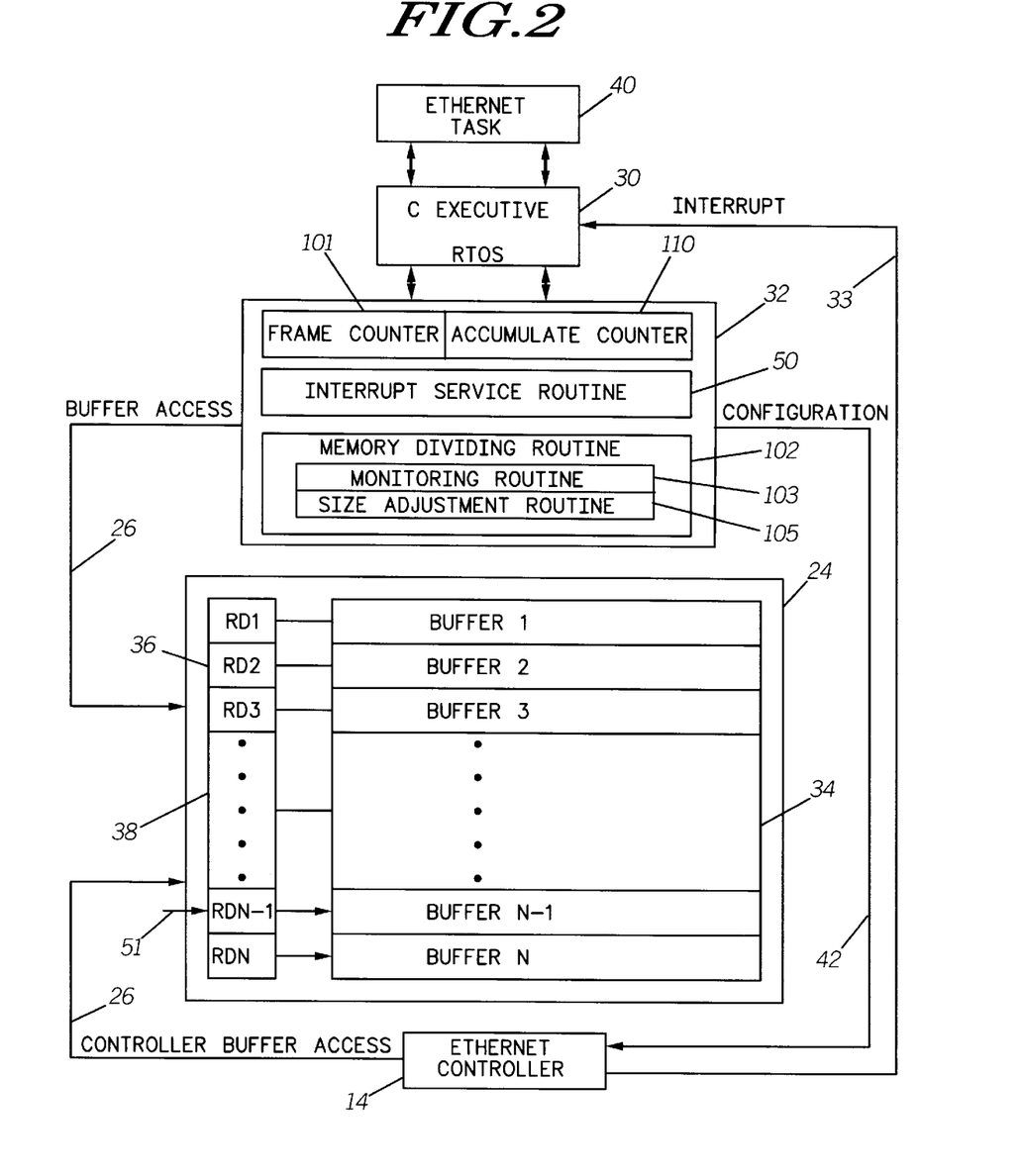
FIG. 2 is a generalized block diagram of the software aspects of an illustrative digital access device utilizing the present invention.

Referring to FIG. 2, the main processor 16 utilizes a conventional Real Time Operating System ("RTOS") 30, commercially sold under the trademark "C Executive RTOS". The NAD 10 includes an Ethernet driver 32, which is linked to the operating system 30. In a conventional manner, the shared memory 24 may be under the control of either the controller 14 or Ethernet driver 32. The controller 14 stores all its Ethernet frames in the shared memory 24, which also is visible as a memory resource to driver 32, so that the data can be passed on to the next higher layer of software. The shared memory 24 is divided up into a plurality of fixed sized, data frame buffers 34, identified as frame buffers 1 through N. This dividing up of the shared memory is accomplished by a memory dividing routine to be described hereinafter. Each of the frame buffers 34 has a received Buffer Descriptor ("BD") 36 associated therewith, identified as buffer descriptors RD 1 through RD N in FIG. 2. These buffer descriptors 36 are organized as entries in a receive buffer descriptor table 38, which comprises a circular queue. Processing of the Ethernet frames occurring at higher software layers of the ISO model are shown as an Ethernet task 40. For the task 40 to use the Ethernet frames, the frames are copied from the shared memory 24 to the main memory by the Ethernet driver 32.

Referring to FIG. 2, each buffer descriptor 36 points to a given one of the frame buffers 34 and provides status information about the data contained in such buffer 34. Each frame buffer 34 is either owned by the Ethernet controller 14 or the Ethernet driver 30, with such ownership being specified in the buffer descriptors 36. As Ethernet frames of data are received from the LAN 12 (shown in FIG. 1), they are transferred by the Ethernet controller 14 to the frame buffers 34 owned by the controller 14. Conventional data-chaining is used by the controller 14 for those Ethernet frames that are too large to fit into a single buffer 34. When a given Ethernet frame is distributed over a plurality of frame buffers 34 using data-chaining, the buffer descriptors 36 for such buffers 34 includes status information as to whether a given one of such buffers 34 includes the beginning or the end of an Ethernet frame. Upon the controller 14 using a frame buffer 34 that it owns to store all or part of an Ethernet frame, ownership of the buffer frame is changed to the Ethernet driver 32. When the controller 14 has stored a complete Ethernet frame, it sends a receive interrupt over line 33 to the Ethernet driver 32. An interrupt service routine 50 of the driver 32, upon receiving the receive interrupt from the controller 14, checks ownership of the newly stored frame(s) in memory 24 and keeps a count of the number of complete frames that it owns. The frame buffers 34 that the driver 32 owns are available for processing by the Ethernet task 40. Thereafter, as the Ethernet task 40 requires the Ethernet frames, the Ethernet driver 32 transfers such Ethernet frames from the shared memory 24 to the main memory. Upon doing this, the driver 32 also relinquishes ownership of the buffer frames 34 containing such Ethernet frames to the controller 14. The driver 32 can reconfigure parameters in the controller 14 over line 42.

In summary, each buffer descriptor 36 for a given buffer 34 contains the following information: 1) the address of the buffer 34 in the shared memory 24, 2) the length of the message in the buffer 34 (i.e., number of bytes) and 3) status information indicating the condition of the buffer. This status information includes the following. First, to permit the queuing and de-queuing of frame buffers 34, ownership of each buffer 34 is allocated to either the controller 14 or Ethernet driver 32. Hence, the buffer descriptor 36 includes an "own" bit within the descriptor status information. Only the current owner is permitted to relinquish ownership or to write to any field in the buffer descriptor 34. Secondly, the status information for a frame buffer includes whether it is the start of a buffer frame or the end of the buffer frame.

When the driver 32 receives a receive interrupt, the driver 32 knows there is a frame somewhere in the shared memory 24. Since the Ethernet controller 14 uses data chaining, a single frame may span multiple buffers 34. The driver 32 has an interrupt service routine 50 which retains the index number of a current receive descriptor 36, which points to a current frame buffer 34. In other words, this index number is used as a pointer 51 to the current buffer descriptor in the buffer receiver table 38. In FIG. 2, the pointer 51 is shown designating the buffer descriptor N-1 as being the current receive buffer descriptor. The current buffer descriptor is defined to be the buffer descriptor of the next frame buffer 34 to be examined by the interrupt service routine 50 in response to receiving a receive interrupt from the controller 14. During start up, the first buffer descriptor 36 is initialized to be the current buffer descriptor. Thereafter, the buffer descriptor last considered by the routine 50 in response to the previous receive interrupt (i.e., one found not to be the owned by the driver 32) becomes the current buffer descriptor.

As will be described in detail with respect to FIG. 3, after determining that the current buffer descriptor is owned by the driver, the current buffer descriptor is examined for the start of an Ethernet frame. As previously mentioned, this may be accomplished because each buffer descriptor 36 has fields specifying whether a given buffer 34 is the start of a frame or the end of a frame. After finding the frame buffer 34 which contains the end of the frame, then the pointer 51 for the current buffer descriptor is set at the next start of the next frame and the above process is repeated until the routine 50 comes to a buffer 34 that it does not own. At this point, the routine 50 stops looking at buffer descriptors 36. Hence, the location in the descriptor table where the service routine 50 leaves off during this check, is the location where the service routine 50 starts its next examination for ownership in response to the next receive interrupt.

From these repeated examinations in response to receive interrupts, the service routine 50 is able to keep track of how many full frames it owns in the shared memory 24 and where they start. For this purpose, the service routine 50 keeps a second index (i.e., second pointer not shown) of the next buffer descriptor 36 to be given to the Ethernet task 40 when asked. To accomplish this, the task 40 performs a driver read to request a frame from the driver 32. If there is a request for frames from the task 40, the driver 32 checks the frame count and if there is a count (not zero), the driver 32 copies the frame to the task's designated location in main memory. Not until then will the driver 32 return ownership of the buffers 34 used for such frames to the controller 14.

Figure 3:
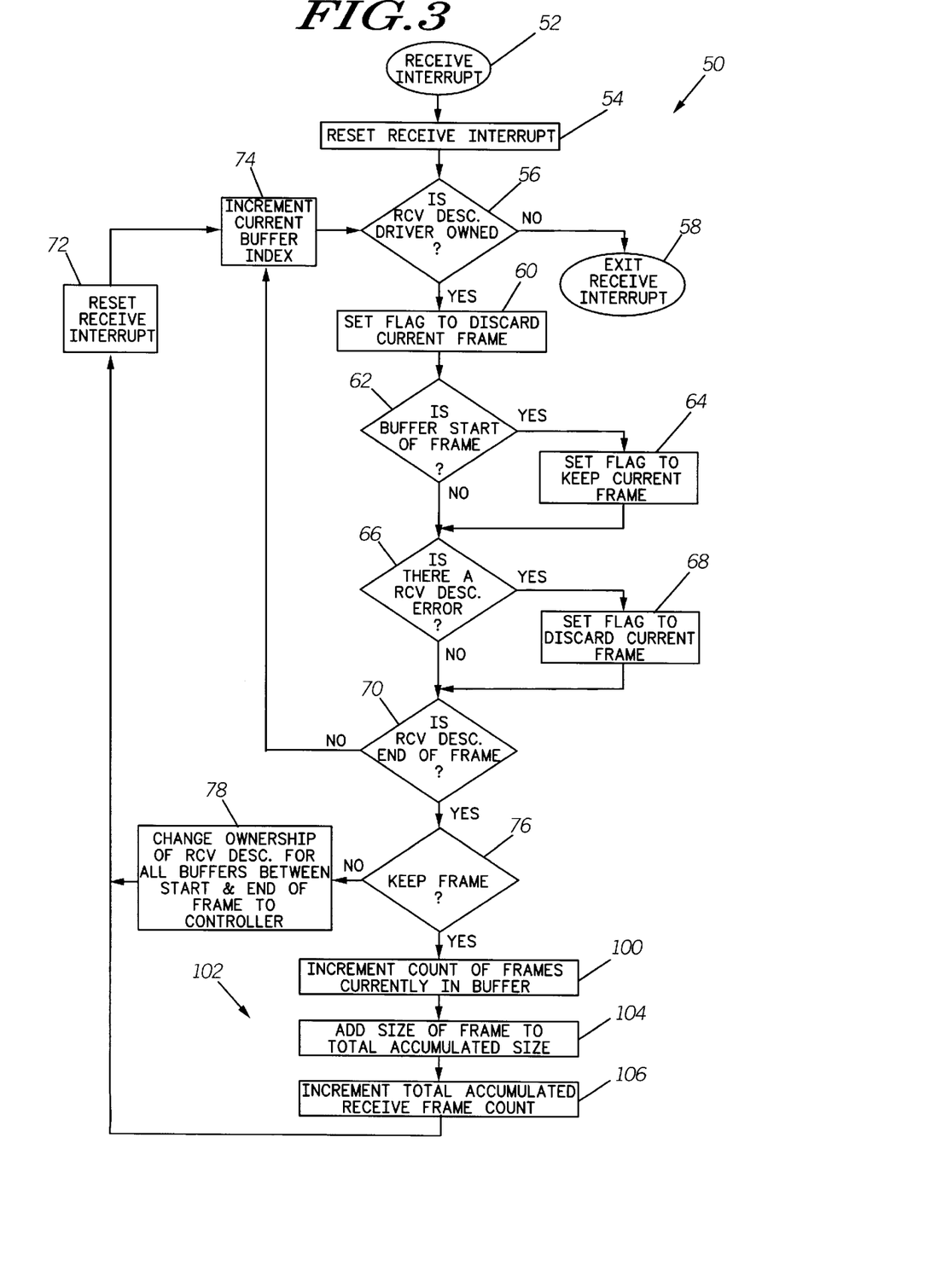
FIG. 3 is a flow diagram of an interrupt service routine and a portion of a memory dividing routine of the Ethernet driver of the present invention.

The flow chart of FIG. 3 illustrates a receive interrupt service routine 50 of the Ethernet driver. This routine 50 begins at step 52, where the routine 50 waits for the arrival of a receive interrupt generated by the Ethernet controller. Upon receiving a receive interrupt, control passes to step 54, where a flag for the receive interrupt is reset. This results in an acknowledgment being sent to the Ethernet controller to drop its receive interrupt signal. Subsequently, control passes to step 56, where the routine 50 determines whether the receive buffer descriptor located at a current buffer descriptor entry in the descriptor table is owned by the driver. If the frame buffer is not owned by the driver, the routine 50 proceeds to step 58, and exits the routine 50. If at the step 56, the routine 50 determines that the buffer descriptor is owned by the driver, then at step 60, a retain frame flag is initialized to zero so as to discard the current frame stored in the current buffer. Unless this retain frame flag is changed elsewhere in the routine 50, it results in a frame being discarded by changing ownership of the frame buffer from the driver to the controller, as will be described hereinafter. Once a frame is discarded, it is available for the controller to use.

Thereafter, control is passed to step 62, where the routine 50 determines whether the current buffer descriptor is the start of a frame. If it is a start of a frame, then at step 64 the frame flag is reset from its initialized state to not keep the frame to a state indicating to keep the current frame. If it is not the start of the frame, control passes to step 66, where the routine 50 determines whether there is an error with respect to the current buffer descriptor. If there is an error, then at step 68, the current state of the retain frame flag is set to discard the frame. If there is not an error, then control passes to step 70, where the current buffer descriptor is examined to determine if it is an end of a frame. If it is not the end of the frame, the routine 50 proceeds to step 74, where the buffer index (pointer 51 in FIG. 2) is incremented by one, so that the next buffer descriptor in the buffer descriptor table is processed by the routine 50. This is accomplished by returning control to step 56.

At step 70, if the current receive buffer descriptor does designate that it contains the end of the frame, then control passes to step 76, where the routine 50 determines whether to keep the frame. This determination is accomplished by the routine 50 examining the retain flag. If the retain flag is set to not to keep the frame, then at step 78, ownership of all the examined buffer descriptors containing the frame (starting with the descriptor having the start and ending with the descriptor having the end) is changed from the driver to the controller. Such frame buffers are now available for the controller to use. Thereafter, control is passed onto step 72, where the receive intercept is reset. This again results in an acknowledgment of the receipt of the receive interrupt being sent to the controller. This set is needed because other receive interrupts could have been received while processing the first interrupt. If at step 76, the routine 50 decides to keep the frame, the driver's current receive frame count is incremented at step 100 and then the routine 50 enters into steps introduced in the routine 50 to accommodate the present invention. The current receive counter counts the number of frames currently in the shared memory that are owned by the driver. This counter is a software implemented counter and is shown by reference number 101 in FIG. 2.

Referring to FIG. 2, a conventional system has a memory dividing routine 102 in the driver 32 where, in response to the designer setting the size of the buffers 34, the driver 32 causes the controller 14 to configure the shared memory 24 to have the designer selected number of buffers 34, each with buffer 34 having the designer selected sizing. Initially, the NAD 10 of the present invention begins operation in this manner.

Through this point in the description, the components, to the extent described, and operation of the NAD 10 are wholly conventional. Referring to FIG. 2, although a more detailed description of some of these conventional elements of the NAD 10 is provided hereinafter, enhanced memory dividing routine 102 of the present invention, residing in the Ethernet driver 32, shall be described next in detail. The enhanced aspects of the memory dividing routine 102 in accordance with the present invention are characterized as including a frame monitoring routine 103 and a buffer size adjusting routine 105, which will be described hereinafter.

Referring to FIG. 2, the shared memory 24 in a conventional manner is initiated by the memory dividing routine 102 of the driver 32 with a given number of frame buffers 34, with each buffer 34 having the same predetermined, fixed size. There are two primary constraints on the selection of these buffers 34: 1) the number of buffers 34 multiplied by the size of the buffers 34 must not exceed the available memory set aside for the receive buffers in the memory 24 and 2) all the buffers 34 must be the same size. The controller 14 has to work with a given combination of buffer size and number of buffers 34.

Generally, the monitoring subroutine 103 of the present invention monitors the consequences of a given combination of the number of buffers 34 and buffer size during operation of the NAD 10. Based upon these monitored results, if the size adjusting routine 105 determines that operation is unacceptable in the manner described hereinafter, the driver 32 causes the controller 14 to be turned off, a new combination of number of buffers and buffer size, as determined by the subroutines 103 and 105, are provided to the controller and controller 14 started again, i.e., reinitialized with these new values so to provide for a new configuration for the shared memory 34.

The number of buffers can be increased by decreasing the buffers' size or the size of the buffers can be increased by decreasing the number of buffers. With a predetermined and fixed amount of the shared memory being allocated to receive frame buffers, increasing the frame buffers' size decreases the processing time required of the driver to reassemble data chained frames at the cost of having fewer buffers; whereas increasing the number of buffers reduces wasted memory at the cost of more processing. As will become apparent hereinafter, the memory dividing routine 102 of the present invention may be used in situations where hardware interface imposes a fixed buffer size and count and the data received by the hardware interface has a variable size.

Since the Ethernet driver is responsible for passing Ethernet frames to the higher protocol layers, it is the driver's responsibility to re-assemble them. As will be described hereinafter with respect to FIGS. 3 and 4, to avoid too much of the extra overhead involved in this re-assembly process, the Ethernet driver of the present invention records the average size packet per 10 minute window and uses this average plus a 5% overshoot to re-configure the size of all receive frame buffers. This reconfiguration process reduces the driver's frame re-assembly time, but still allows for efficient use of buffer space.

It is not desirable to re-configure the size of the frame buffers too often. Therefore, the re-adaptation procedure of the present invention only takes place under certain conditions in the preferred embodiment, which are as follows: (1) an average size of data frames must have been collected because without any data, a decision cannot be made, (2) the average size frame must be larger than the current buffer size (as currently set in the driver) for if this is the case, the driver is spending too much time re-assembling frames, or the average size frame must be smaller by 25% of the current buffer size so as to better take advantage of buffer space. More specifically, these two thresholds that can trigger reconfiguration of the buffer space are determined as follows:

$$\text{Average Frame Size} = \frac{\text{Accumulated Receive Frame Size}}{\text{Number of Receive Frames}} \quad \text{Eq 1}$$

$$\text{Increased Average Frame Size} = (\text{Average Frame Size})(1.05) \quad \text{Eq 2}$$

$$\text{Available Receive Buffer Count} = \frac{\text{Memory Space for Receive Frames}}{\text{Increased Average Frame Size}} \quad \text{Eq 3}$$

The "Available Receive Buffer Count" is the number of receive frame buffers that could be used by the driver. The memory dividing routine 102 compares the "Available Receive Buffer Count" against a "Current Receive Buffer Count", which is the number of receive frame buffers the shared memory is currently configured to have. More specifically, in the preferred embodiment, a window of the two reconfiguration thresholds are defined as follows, either of which results in reconfiguration:

1) Available RCV Buffer CNT<Current RCV Buffer CNT  Eq 4

With this first threshold, if it is triggered it means that the current number of frame buffers are too large and that too much processor time is being wasted by the driver on reassembling frames. By adopting the Available Receive Buffer Count, there will be less buffers, but the buffer size is increased. Because of the inverse relationship between the Average Frame Size and the Available Receive Buffer Count, triggering this threshold means that the current buffer size is too small and is therefore increased.

2) (Available RCV Buffer CNT) (1.25)>Current RCV Buffer CNT  Eq 5

With this second threshold, if it is triggered it means that the current number of frame buffers is too small, so as to waste buffer space and risk not having enough frame buffers. By adopting the Available Receive Buffer Count, there will be more frame buffers, but the buffer size is decreased. Because of the inverse relationship between the Average Frame Size and the Available Receive Buffer Count, triggering this threshold means that the current buffer size is too large and is therefore decreased. Although the above two thresholds of Equations 4 and 5 are calculated with respect to Available Received Buffer Count, the calculations are equivalent to using the Increased Average Frame Size since they are inversely related via Equation 3. Hence, the steps of the routine 102 for implementing Equations 4 and 5 provide comparison means for comparing the current size of the buffers with the average size of the frames over the period of monitoring of such frames.

In the preferred embodiment, it is important to notice that the driver does not immediately re-adapt the buffer size if the calculated Average Frame Size is slightly smaller than the current buffer size (second threshold consideration), due to the addition of the 25% increase in the second threshold. Hence, there is a window in which no change will take place so as to avoid continuous reconfigurations.

In the case of the preferred embodiment, processor power takes precedence over buffer space, i.e., more importance is attached to not wasting processor power than to not wasting buffer space. But if the application needs buffer space more and can spare processor power, the last two rules may be changed to the following: (1) the Average Size Frame must be larger by 25% of the current size buffer because if this is the case, the driver is spending too much time re-assembling frames and (2) the average size frame must be smaller than the current size buffer so as to better take advantage of buffer space. It should be noted that the 25% factor for creating the above mentioned window to reduce the number of readaptions is a matter of design choice and those skilled in the art may elect other factors based upon their specific applications and needs.

As mentioned above, the algorithm for the size adaptation routine 102 records the average size packet per every 10 minute window. This average plus a 5% overshoot is used to configure the size of all the receive buffers. The use of the 5% overshoot in calculating the Increased Average Frame Size is a matter of design choice and may be dispensed with, or increased or decreased. Its effect is to slightly increase the buffer size to account for a standard deviation in the calculated value. In the preferred embodiment, an increase was chosen over a decrease in order to reduce processor utilization. In operation, at least after the first adaptation, this overshoot provided to the Average Frame Size does not reduce the number of reconfigurations, as does the above mentioned 25% readaption reducing factor.

The memory dividing routine 102 of the present invention maintains the buffer size between the maximum Ethernet packet size (1518 bytes) and a minimum size that makes the buffer count reasonably maintainable (~200 bytes). The goal of this routine is to save RAM space and to reduce processor load. Therefore, it is important to keep all calculations simple: a running count of all incoming packets and the sum of their sizes is the only demand on the processor since the re-adaptation decision and calculations should only take place at large intervals.

Referring to FIG. 3, the memory dividing routine 102 includes adding onto the interrupt routine 50 the steps of 104 and 106. After step 100, at step 102 the size of the frame is added to the total accumulated size of the frames, i.e., a running sum of all the sizes of frames kept by the routine 102. This defines the previously mentioned accumulated Receive Frame Size. Thereafter, at step 106, an accumulated frame counter is incremented by 1. This frame counter counts the number of frames whose sizes have been added to the total accumulated size in step 104, i.e., the previously mentioned Number of Receive Frames. The accumulate frame counter is software implemented counter and is shown by the reference number 110 in FIG. 2.

Figure 4:
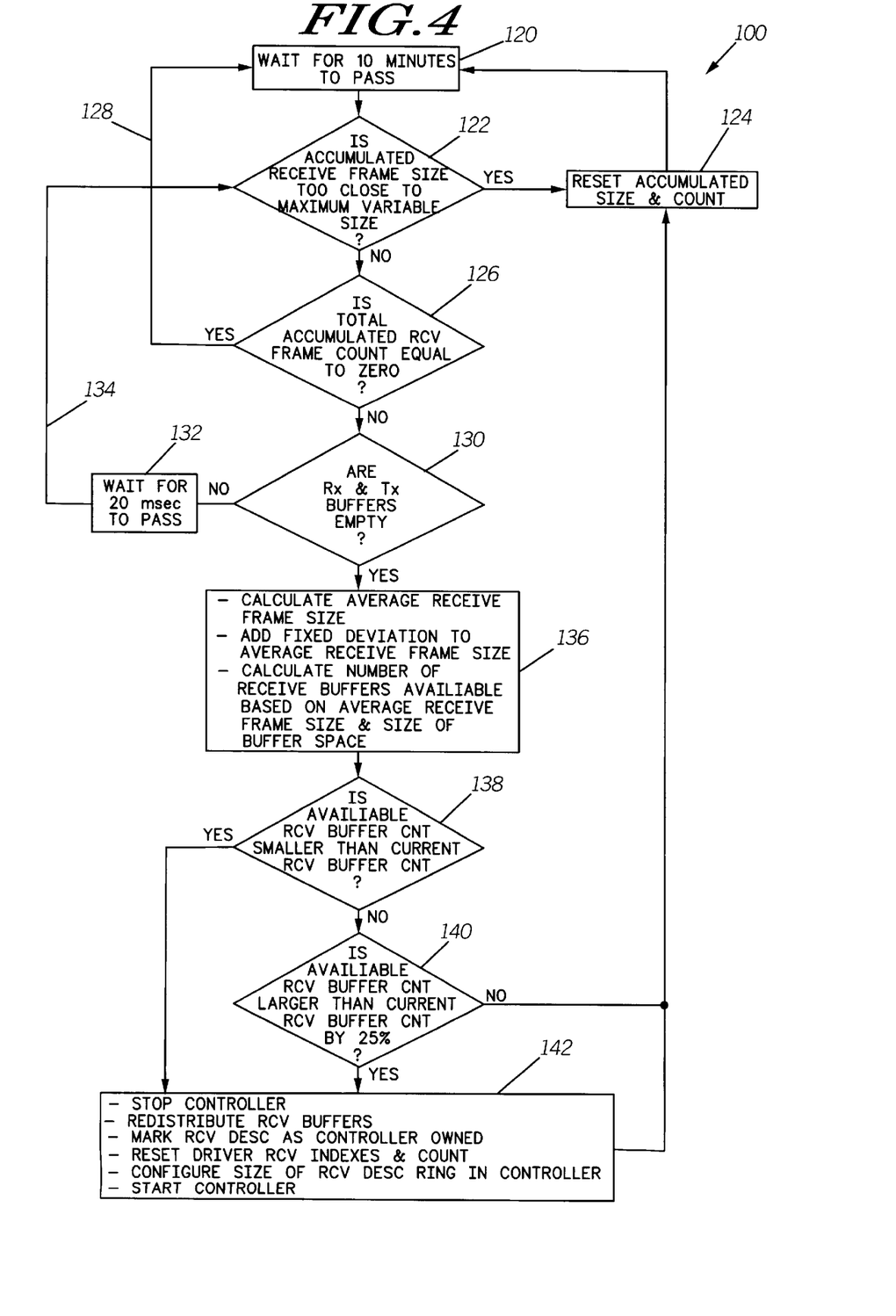
FIG. 4 is a flow diagram of the rest of a memory dividing routine of the Ethernet driver of the present invention.

Referring to FIG. 4, the remainder of the memory dividing routine 102 is shown. At step 120, the routine 102 waits for a time period of ten minutes to elapse. Upon completion of this 10 minute period, control is passed to step 122, where the routine 100 compares the Accumulated Receive Frame Size calculated at step 104 to a maximum variable size. If this maximum variable size is exceeded, then control is transferred to step 124, where the total Accumulated Size of step 104 and the total accumulated frame count i.e., Number of Receive Frames, are reset. This maximum variable size is calculated by taking the maximum size of the buffer for storing the Accumulated Receive Frame Size (which in the present invention is 32 bytes) and subtracting from the 32 bytes double the amount of data which can be transferred during the 20 msec delay of step 132 to be described hereinafter (25K bytes of data can be received in 20 msec. Twice this amount guarantees that the accumulated frame size variable is not overrun.) If this maximum variable size is not exceeded, then at step 126, the routine 102 determines whether the total accumulated received frame count is equal to zero. If it is equal to zero, then control reverts back to step 120 via loop 128. If it is not equal to zero, then control passes to step 130, where the routine 102 determines whether the receive or transmit frame buffers are empty. If they are not empty, then control passes to step 132, which delays the routine 102 for 20 microseconds. After the delay, control reverts to step 122 via a loop 134.

If the receive frame or transmit frame buffers are empty at step 130, then control passes to step 136, where a number of calculations are performed, which were described above. In other words, this step 130 allows for the processing of step 136 to occur when the driver is idle, i.e., there are no frames in the shared memory to be processed by the task. To determine that there are no frames to be processed, at step 130, the frame counts of frames awaiting processing by the Ethernet tasks are checked.

Generally, those steps of routine 102 required to reach the calculation of Equation 1 are allocated to the frame monitoring subroutine 103, whereas the remainder of the steps of routine 102 are allocated to the buffer size adjusting subroutine 105.

In a first calculation of the previously mentioned Equation 1, the Average Frame Size is calculated by dividing total Accumulated Frame Size of step 104 by the total accumulative received frames, i.e., Number of Receive Frames calculated in step 106. In a second calculation of Equation 2, a fixed deviation is added to the Average Frame Size. For example, 5% of the Average Receive Frame Size is added to itself to give an Increased Average Frame Size, e.g., Average Receive Frame Size multiplied by 1.05 equals the Increased Average Frame Size. In a third calculation of Equation 3, the number of available receive buffers, i.e., Available Receive Buffer Count, is calculated by dividing the Increased Average Frame Size into the available buffer space in the shared memory that has been allocated for received Ethernet frames. Upon completion of these three calculations; control passed to step 138, where the routine 102 determines whether the calculated Buffer Count determined in step 136 is smaller than the Current Receive Buffer Count being used by the NAD 10 (See Equation 4). If the Available Buffer Count is not smaller than the Current Buffer Count, then control passes to step 140, where the routine 102 determines if the Available Buffer Count is larger than the Current Buffer Count by 25%. If no, the routine 102 passes control on to step 124, which has already been described. If yes, then control passes to step 142, where the routine 102 takes the following actions. First, it stops the controller, redistributes the receive buffers to have the number of the calculated Available Buffer Count, switches ownership of these new buffers to the controller, resets the driver receiver indexes and frame count, configures the size of the receive description table in the controller (the controller must know the number of buffers) and restarts the controller. Referring back to FIG. 2, the reconfiguration of the controller 14 is undertaken by the driver 32 via the line 42.

Figure 5:
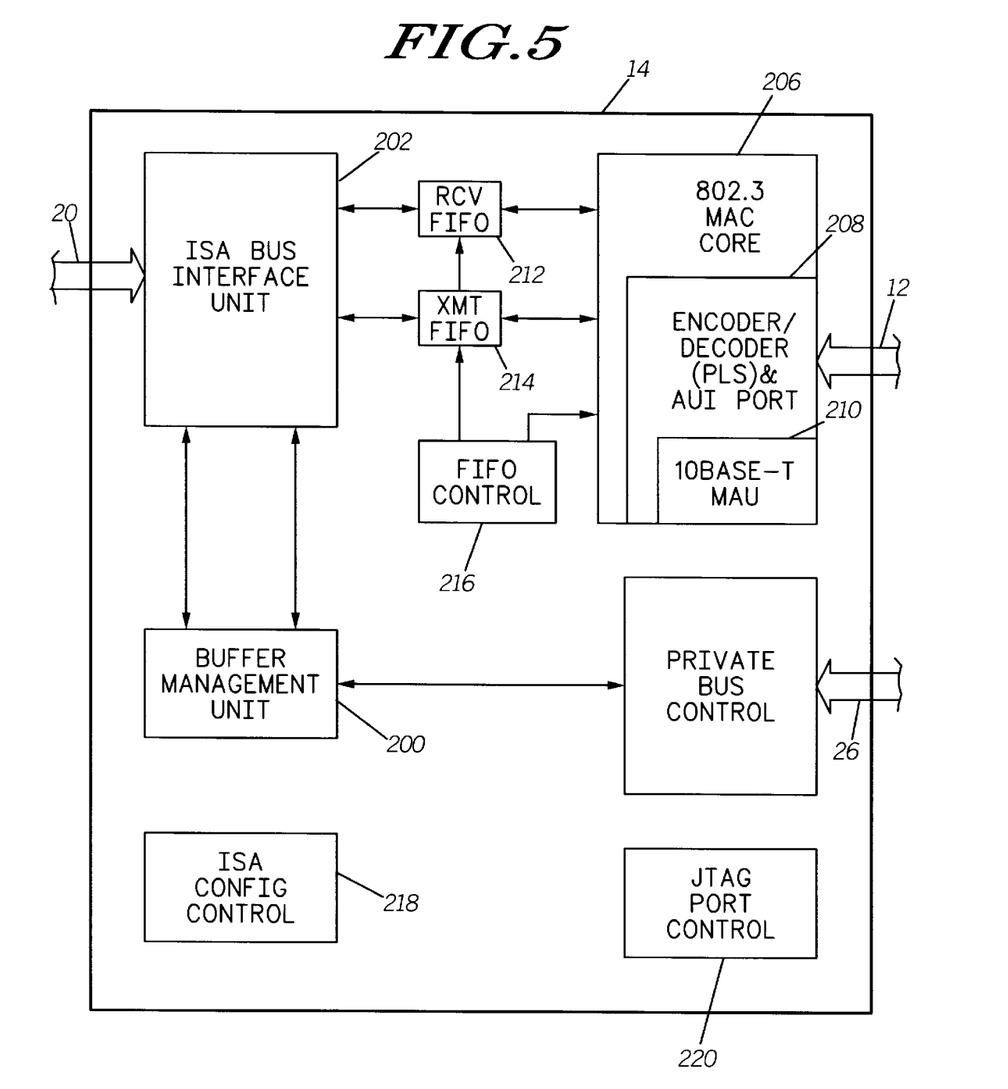
FIG. 5 is a block diagram of the components of the Ethernet controller used in conjunction with the Ethernet driver.

With respect to FIG. 5, although the Ethernet controller 14 is of conventional design and commercially available, its major components are briefly described herein. The controller 14 includes a buffer management unit 200 for managing the frame buffers. An ISA Bus Interface Unit ("BIU") 202 provides an interface with the system bus 20 and the private bus control 204 provides an interface to the private bus 26. The controller 14 also includes an IEEE Media Access controller ("MAC") 206 for providing the CSMA/CD management, along with Manchester encoder/decoder 208, and a 10Base-T Media Access Unit ("MAU") interface 210 to the LAN 12. The MAC 206 incorporates the essential protocol requirements for operation of a compliant Ethernet/ 802.3 node and provides the interface between the FIFO sub-system (described hereinafter) and the encoder/decoder 208. The integrated encoder/decoder 208 provides the PLS (Physical Layer Signaling) functions required for a fully compliant IEEE 802.3 station. The controller 14 also includes a receive FIFO buffer 212 and a transmit FIFO buffer 214, with a FIFO control 216. When an Ethernet frame is received, it fills the FIFO buffer 212 until its threshold of 64 bytes is reached. Then these bytes are transferred from the FIFO buffer 212 to the shared memory 24 in manner to be described hereinafter. An ISA configuration control 218 and JTAG port control 220 is also included. Typically, the Ethernet controller 14 is coupled to and uses a number of other well known components, i.e., Ethernet address PROM, Boot PROM, address buffer and address compare. However, these conventional components are not part of the present invention and will not be described herein.

With respect to FIG. 2, an AMD PCnet-ISA controller used for the Ethernet controller 14 is a DMA-based device with a dual architecture that can be configured in two different operating modes to suit a particular PC application. For use with the present invention, the AMD PCnet-ISA controller is configured to perform shared memory mode for Ethernet frame buffering. As described in the specifications for the AMD PCnet-ISA chip and above, buffer management of the controller 14 is accomplished through the buffer descriptors 36 organized in the descriptor table 38, as previously described. The table 38 is set up as a circular queue, i.e., after the last buffer descriptor 36 is used, the first buffer descriptor 36 is used. This type of table is sometimes characterized as forming rings of buffer descriptors. There are two such tables, a receive descriptor table 38 and a transmit descriptor table (not shown). However, only the receive descriptor table 38 is relevant to the present invention; hence, only it is disclosed in the FIG. 2 and discussed hereinafter. In FIG. 2, each receive buffer descriptor (BD) 36 is shown with an index number to indicate its order in the table 38, i.e., the descriptor table comprises an array of ordered buffer descriptors 36. Although the data structure of this descriptor table 38 is well known, it will briefly be described herein so as to better understand the invention.

All configuration registers (not shown) of the Ethernet controller 14 are accessed by the driver 32 using I/O operations via line 42. In this manner, the controller 14 receives the new values for the number of buffers from the driver 42. The driver writes the size of each buffer to its corresponding buffer descriptor. The controller acquires the size of the buffers from these descriptors. The controller 14 reconfigures the shared memory as described elsewhere using these new values. However, to facilitate initialization, the controller 14 can obtain its operating parameters by reading an initialization block from the shared memory 24, such block being initialized by the driver 32. Hence, at initialization time, the controller 14 reads, over the private bus 26, the user-defined based address for the receive descriptor table 38, as well as the number of buffer descriptors 36 contained in the descriptor table 38. When the receive function begins, the base address of the table 38 is loaded into a current descriptor address register (not shown) of the controller 14 and the address of the next buffer descriptor 36 in the receive descriptor table 38 is computed and loaded into a next descriptor address register (not shown) of the controller 14. When there is no channel activity and there is no pre- or post-receive or transmit activity being performed by the controller 14, then the controller 14 periodically polls, over the private bus 26, the entry for current receive descriptor 36 in the table 38 in order to ascertain its ownership, i.e., the driver or the controller. A typical polling operation consists of the following. The controller 14 uses the address of the current receive descriptor 36 stored internally to vector to the appropriate entry in the table 38. These accesses will be made for the descriptors BD1 and BD0 of the table 38 at periodic polling intervals. All information collected during polling activity will be stored internally in the status registers (not shown) of the controller 14. When a frame from the LAN 12 is accepted by the controller 14, the controller 14 suspends execution of the above described poll-time-incrementing microcode routine so that a receive microcode routine may instead be executed. However, following the completion of any receive or transmit operation, a poll operation will always be performed.

If the controller 14 does not own both the current descriptor 36 (as identified in the current descriptor address register) and the next descriptor 36 (as identified in the next descriptor address register), then the controller 14 continues to poll according to polling sequence described above. If a poll operation has revealed that the current and the next buffer descriptors belong to the controller 14, then additional poll accesses are not necessary. When Ethernet frames are presented to the controller 14 from the LAN 12, the controller 14 waits for the complete address of the frame to arrive. It then decides whether to accept or reject the frame based on all active addressing schemes. If the frame is accepted by the controller 14, the controller 14 checks the current buffer descriptor to determine the ownership of the current buffer 34. If ownership does not belong to the controller 14, then the controller 14 immediately performs a (last ditch) poll of the current table 38. If ownership is still denied, then the controller 14 has no available buffers in which to store the incoming Ethernet frames. If the controller 14 sees that the last poll (either a normal poll or the last-ditch effort described above) of the current descriptor 36 shows valid ownership, then it proceeds to a poll of the next descriptor 36. Following this poll, and regardless of the outcome of this poll, transfers of receive data from the FIFO buffer begins.

The incoming Ethernet frame may be distributed over any number of the provided buffers 34. This is accomplished by data chaining, as previously described. Regardless of ownership of the second receive descriptor, the controller 14 continues to perform receive data DMA transfers to the first buffer, using burst-cycle DMA transfers. If the frame length exceeds the length of the first buffer, and the controller 14 does not own the second buffer, ownership of the current descriptor will be passed back to the driver, along with indicating possibly over-flow errors. This activity continues until the controller 14 recognizes the completion of the frame (the last byte of this receive message has been removed from the FIFO). The controller 14 subsequently updates the status information.

When the controller 14 has transferred a whole Ethernet frame to memory 24 using one or more buffers 34, it also has set the ownership of these buffers 34 to indicate that the driver 32 now owns these buffers 34. At this point in time the main processor gets interrupted via the controller 14 sending a receive interrupt over one of the control lines of the system bus 20, such control line being identified by the reference numeral 33. In a conventional manner, the Ethernet driver 32 is linked into the operating system 30 for the main processor. When the processor receives a receive interrupt from the controller 14, the operating system vectors to the interrupt handler or service routine 44 which resides in the Ethernet driver 32. Hence, the processor calls and executes the handler routine 44 of the driver 32 to process the receive interrupt.

The driver 32 also has additional functions. The driver 32 initializes the controller 14 by updating information in the shared memory 24 used to initialize the controller 14. The driver 32 also allows a task 40 to write and read Ethernet frames to/from the shared memory 24. The driver's interface also allows the task 40 to configure the controller 14, by using the I/O control functionality, read or clear the driver's status information, start and stop a test, clear a test's error count or insert an error into a test.

The present invention may be implemented in a number of ways, as will be clear to those skilled in the art. Of course, those skilled in the art will appreciate that while this arrangement is preferred, it is not intended to be limiting as other arrangements of the frame are possible.

What is claimed is:

1. A data communication system, comprising:
    a frame handling device having a driver and a processor for executing said driver;
    a controller for receiving a plurality of frames of digital signals;
    a shared memory operable for being accessed by said driver or said controller;
    said driver including memory dividing means for dividing said shared memory into a number of frame buffers with each of said frame buffers having a fix size;
    said controller including frame storing means for storing each said frame in one of said frame buffers in response to said frame being equal to or less than the size of said one buffer or in a plurality of said frame buffers in response to said frame exceeding the size of said one buffer; and
    said memory dividing means including monitoring means for measuring the sizes of said frames over a predetermined period of time and size adjusting means for adjusting said fix size and said number of said frame buffers in response to said monitoring means.

2. The data communications system according to claim 1, wherein said monitoring means is operable for determining an average size of said frames over said period of time.

3. The data communications system according to claim 2, wherein said fixed size of said buffers during said period of time is defined to be a current size and said size adjusting means includes comparison means for comparing said average size to said current size to determine a new said size for said frame buffers and a new said number of said frame buffers.

4. The data communications system according to claim 3, wherein said size adjusting means is operable to provide said new size to be larger than said current size of said frame buffers in response to said comparison means determining that said average size is greater than said current size.

5. The data communications system according to claim 3, wherein said size adjusting means is operable to increase said current size of said frame buffers in response to said comparison means determining that said average size is greater than said current size by a predetermined amount, whereby said size adjusting means use of said predetermined amount favors reducing waste of said frame buffers.

6. The data communications system according to claim 5, wherein said predetermined amount includes a selected portion of said average size.

7. The data communications system according to claim 3, wherein said size adjusting means is operable to provide said new size which is smaller than said current size of said frame buffers in response to said comparison means determining that said average size is less than said current size.

8. The data communications system according to claim 3, wherein said size adjusting means is operable to decrease said current size of said frame buffers in response to said comparison means determining that said average size is less than said current size by a predetermined amount whereby said adjusting means use of said predetermined amount favors reducing processing time of said processor.

9. The data communications system according to claim 8, wherein said predetermined amount includes a selected portion of said average size.

10. The data communications system according to claim 3, wherein said size adjusting means is operable for increasing said average frame size by a predetermined amount before said comparison means uses said average frame size.

11. The data communications system according to claim 1, wherein said frame handling device comprises a network access device.

12. The data communications system according to claim 1, wherein said frame storage means includes means for data chaining to distribute a given said frame over more than one of said frame buffers.

13. The data communications system according to claim 1, wherein said frame processor includes a main memory and said processor being operable for transferring said frames from said shared memory to said main memory.

14. The data communications system according to claim 1, wherein said frames are LAN frames.

15. The data communications system according to claim 14, wherein said local area network frames comprise Ethernet Frames and said controller comprises an Ethernet controller.

16. The data communications system according to claim 3, wherein said shared memory is a fixed size.

17. The data communications system according to claim 14, wherein said data communications systems includes a local area network for providing said local area network frames to said controller and said frame handling device consists of a network access device for communications with a primary network.

18. The data communications system according to claim 3, wherein said controller includes reconfiguration means for redefining, in response to said driver, said shared memory to have said frame buffers with said new size and said new number of buffers.

19. The method according to claim 1, wherein said frames are LAN frames.

20. A method for data communications, comprising:
    providing a shared memory operable for being accessed by a driver of a processor or a controller;
    dividing said shared memory into a number of frame buffers with each of said frame buffers having a fix size;
    storing each said frame in one of said frame buffers in response to said frame being less than the size of said one buffer or in a plurality of said frame buffers in response to said frame exceeding the size of said one buffer;
    measuring the sizes of said frames over a predetermined period of time; and
    adjusting said fix size and said number of said frame buffers in response to said measuring of said sizes.

21. The method according to claim 20, wherein said step of measuring including determining an average size of said frames over said period of time.

22. The method according to claim 21, wherein said fixed size of said buffers during said period of time is defined to be a current size and said step of adjusting includes comparing said average size to said current size to determine a new said size for said frame buffers and a new said number of said frame buffers.

23. The method according to claim 22, wherein said step of adjusting includes setting said new size to be larger than said current size of said frame buffers in response to determining that said average size is greater than said current size.

24. The method according to claim 22, wherein said step of adjusting includes increasing said current size of said frame buffers in response to determining that said average size is greater than said current size by a predetermined amount, whereby the use of said predetermined amount favors reducing waste of said frame buffers.

25. The method according to claim 24, wherein said predetermined amount includes a selected portion of said average size.

26. The method according to claim 22, wherein said step of adjusting includes setting said new size to be smaller than said current size of said frame buffers in response to determining that said average size is less than said current size.

27. The method according to claim 22, wherein said step of adjusting includes decreasing said current size of said frame buffers in response to determining that said average size is less than said current size by a predetermined amount, whereby the use of said predetermined amount favors reducing processing time of said processor.

28. The method according to claim 27, wherein said predetermined amount includes a selected portion of said average size.

29. The method according to claim 22, wherein said step of adjusting includes increasing said average frame size by a predetermined amount before said step of comparing uses said average frame size.

30. The method according to claim 22, further including reconfiguring said shared memory to have said frame buffers with said new size and said new number of buffers.

* * * * *